(12) United States Patent
Roth-Schuler et al.

(10) Patent No.: US 7,487,990 B2
(45) Date of Patent: Feb. 10, 2009

(54) SEMITRAILER COUPLING

(75) Inventors: Christian Roth-Schuler, Singen (DE); Dirk Schneider, München (DE)

(73) Assignee: Georg Fischer Verkehrstechnik GmbH (DE)

( * ) Notice: Subject to any disclaimer, the term of this patent is extended or adjusted under 35 U.S.C. 154(b) by 325 days.

(21) Appl. No.: 10/538,541

(22) PCT Filed: Oct. 31, 2003

(86) PCT No.: PCT/EP03/12171

§ 371 (c)(1),
(2), (4) Date: Jan. 13, 2006

(87) PCT Pub. No.: WO2004/052713

PCT Pub. Date: Jun. 24, 2004

(65) Prior Publication Data

US 2006/0170190 A1    Aug. 3, 2006

(30) Foreign Application Priority Data

Dec. 10, 2002   (DE) .............................. 102 57 807

(51) Int. Cl.
    B62D 53/06    (2006.01)
(52) U.S. Cl. ...................................... 280/433
(58) Field of Classification Search ................. 280/433
    See application file for complete search history.

(56) References Cited

U.S. PATENT DOCUMENTS

| 5,746,438 A | * | 5/1998 | Bergmann et al. | .......... 280/433 |
| 6,182,996 B1 | * | 2/2001 | Koetter et al. | ................ 280/433 |
| 6,623,024 B1 | * | 9/2003 | Alguera Gallego et al. | . 280/433 |

FOREIGN PATENT DOCUMENTS

| EP | 0 694 467 | 1/1996 |
| WO | WO 01 34454 | 5/2001 |
| WO | WO0134454 A1 * | 5/2001 |

* cited by examiner

*Primary Examiner*—Paul N Dickson
*Assistant Examiner*—Michael R Stabley
(74) *Attorney, Agent, or Firm*—Bachman & LaPointe, P.C.

(57) ABSTRACT

A semitrailer coupling comprising a coupling plate and a bearing block used for movably fastening the coupling plate to a frame of a tractor. The bearing block is provided with a bearing area and a fastening area. The bearing area is embodied such that the coupling plate can be pivotably mounted while the fastening area is configured such that the coupling plate can be detachably fixed to a frame of the tractor. The bearing area has a larger cross section than the fastening area, the cross section extending in the direction of travel (x) and parallel to the pivoting axis (y).

8 Claims, 3 Drawing Sheets

SEMITRAILER COUPLING

BACKGROUND OF THE INVENTION

The invention relates to a semitrailer coupling comprising a coupling plate and a bearing block for movable fastening of the coupling plate to a frame of a tractor, the bearing block having a bearing region and a fastening region, the bearing region being designed for pivotable bearing of the coupling plate and the fastening region being designed for detachable fastening of the coupling plate to the frame of the tractor.

In motor vehicle traffic, increasing use is made of semitrailer trucks with semitrailer couplings. A tractor has a coupling plate, into which a pin, what is known as the king pin, of the trailer is engaged. In this connection, the trailer lies relatively freely movably on a semitrailer coupling plate of the tractor. The semitrailer coupling plate is connected to the frame of the tractor via two bearing blocks. The bearing blocks comprise bearing elements, which are arranged transversely to the direction of travel of the tractor and make possible pivoting of the coupling plate about a pivoting axis transversely to the direction of travel.

A semitrailer coupling of the generic type is known from WO 01/34454 A1. The bearing blocks, which are in each case fastened on the left and right side of the vehicle frame, are interconnected parallel to the pivoting axis via a cross-strut. The cross-strut can also be designed on the inner side of the vehicle as a projection on the bearing block concerned. The bearing blocks, the projections and/or the cross-struts rest on the horizontal surface of the frame construction of the tractor.

It is an object of the invention to provide a semitrailer coupling which is constructed from as few individual parts as possible, the weight of which is as low as possible and which is compatible with existing semitrailer coupling plates.

SUMMARY OF THE INVENTION

The object is achieved by a semitrailer coupling comprising a coupling plate and a bearing block for movable fastening of the coupling plate to a frame of a tractor, the bearing block having a bearing region and a fastening region, the bearing region being designed for pivotable bearing of the coupling plate and the fastening region being designed for detachable fastening of the coupling plate to the frame of the tractor, and, sectioned in the direction of travel and parallel to the pivoting axis, the bearing region having a larger cross section than the fastening region.

It is advantageous that the semitrailer coupling can be constructed from as few individual parts as possible. This is achieved by virtue of the fact that the bearing blocks are formed from a one-piece casting.

It is also advantageous that transverse forces which act on the semitrailer coupling can be compensated in the bearing blocks. This is achieved by virtue of the fact that the bearing region of the bearing blocks is designed in such a way on the inner side of the vehicle that a clearance for movements of the coupling plate in a direction transverse to the direction of travel is present between the bearing region and the semitrailer coupling plate.

BRIEF DESCRIPTION OF THE DRAWINGS

An illustrative embodiment of the invention is described with reference to the Figures, in which.

DETAILED DESCRIPTION

Figure 1:
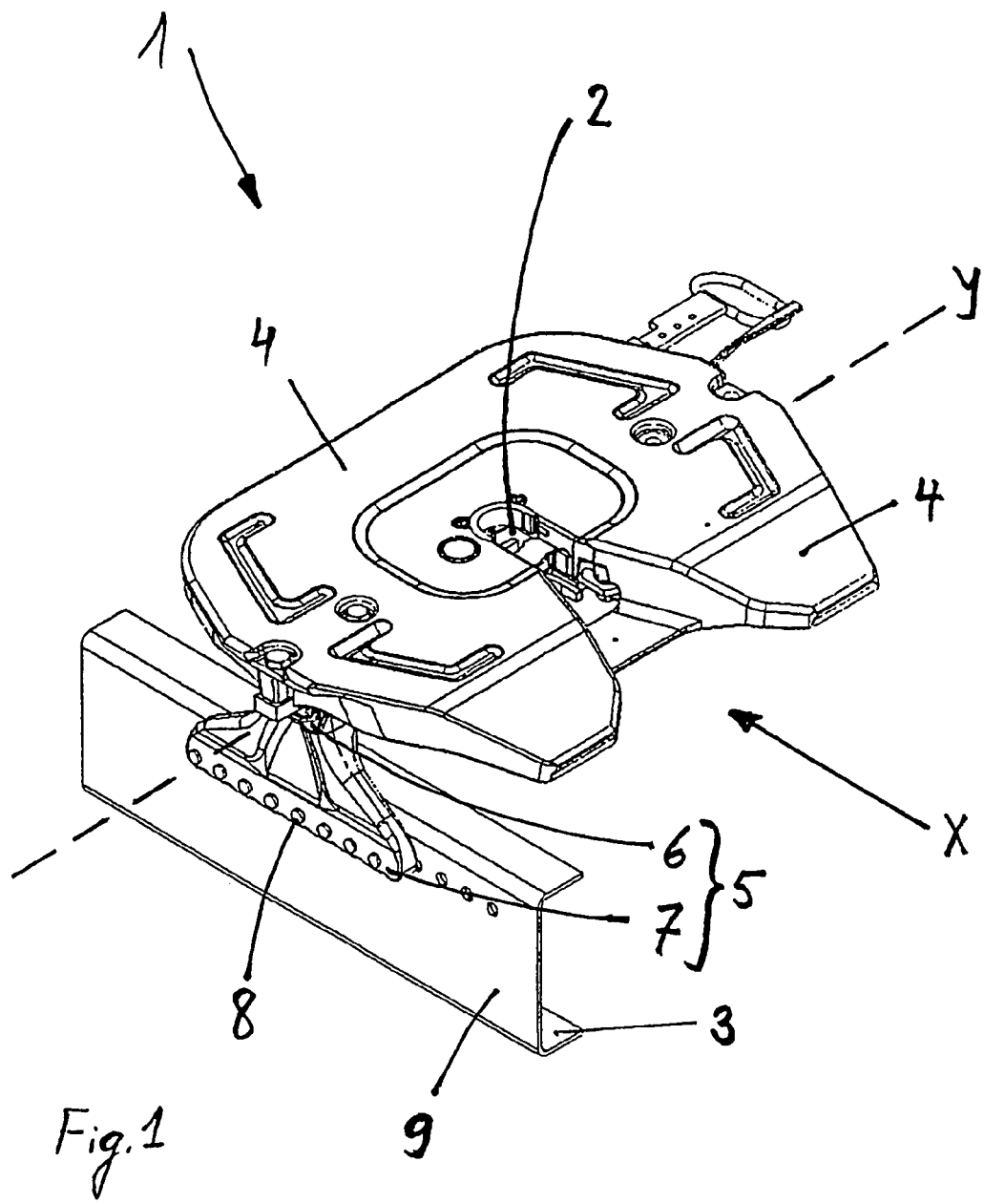
FIG. 1 shows a three-dimensional view of a semitrailer coupling according to the invention.

A semitrailer coupling 1 is illustrated in three-dimensional form in FIG. 1. The semitrailer coupling 1 is arranged on a tractor (not illustrated here) and serves for movable connection of the tractor to a trailer (likewise not illustrated here) of a semitrailer truck combination. When the trailer is coupled to the tractor, what is known as a king pin, which is arranged on the front lower side of the trailer, is located in a coupling claw 2 of the semitrailer coupling 1. Of the tractor, only a part region of a frame 3 is illustrated. The semitrailer coupling 1 comprises essentially a coupling plate 4 and two bearing blocks 5, only one bearing block 5 of which is illustrated here on the left side in the direction of travel x of the tractor.

The bearing block 5 has two regions with different functions: a bearing region 6 and a fastening region 7. Bearing elements, which serve for pivotable mounting of the coupling plate 4 about a pivoting axis y, are located in the bearing region 6. The pivoting axis y extends transversely to the direction of travel x of the tractor. Screws 8, with which the bearing block 5 is fastened to the frame 3 of the tractor, can be seen in the fastening region 7. The bearing block 5 is advantageously fastened to the vertical side surface 9 of the vehicle frame 3 by means of screws 8. Lateral screw fastening makes it possible for mounting and demounting to be carried out extremely easily on existing vehicle frames as well.

Figure 2:
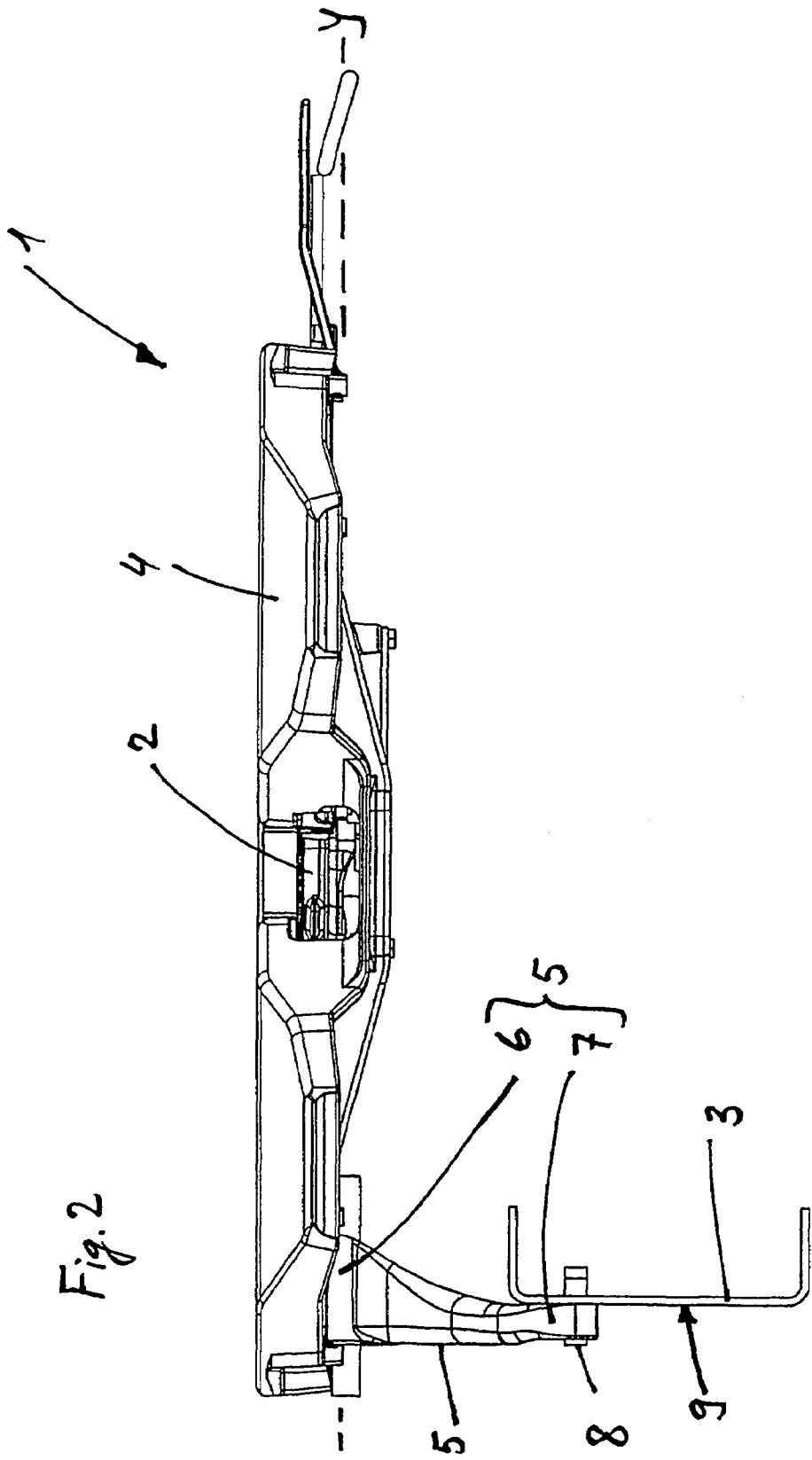
FIG. 2 shows a view of the semitrailer coupling from FIG. 1 in the direction of travel.

In FIG. 2, the semitrailer coupling 1 from FIG. 1 is again illustrated, seen in the direction of travel x of the tractor. It can be seen clearly here how the fastening region 7 of the bearing block 5 is fastened to the vertical side surface of the vehicle frame 3 with screws 8. No fastening or support is necessary on the horizontal surface of the vehicle frame 3, which is a surface with extremely poor access in the assembled state of the tractor. The second bearing block 5 on the right side of the coupling plate 4 has been omitted in FIG. 2 for greater clarity. The references in FIG. 2 refer to the same features as described in FIG. 1.

Figure 3:
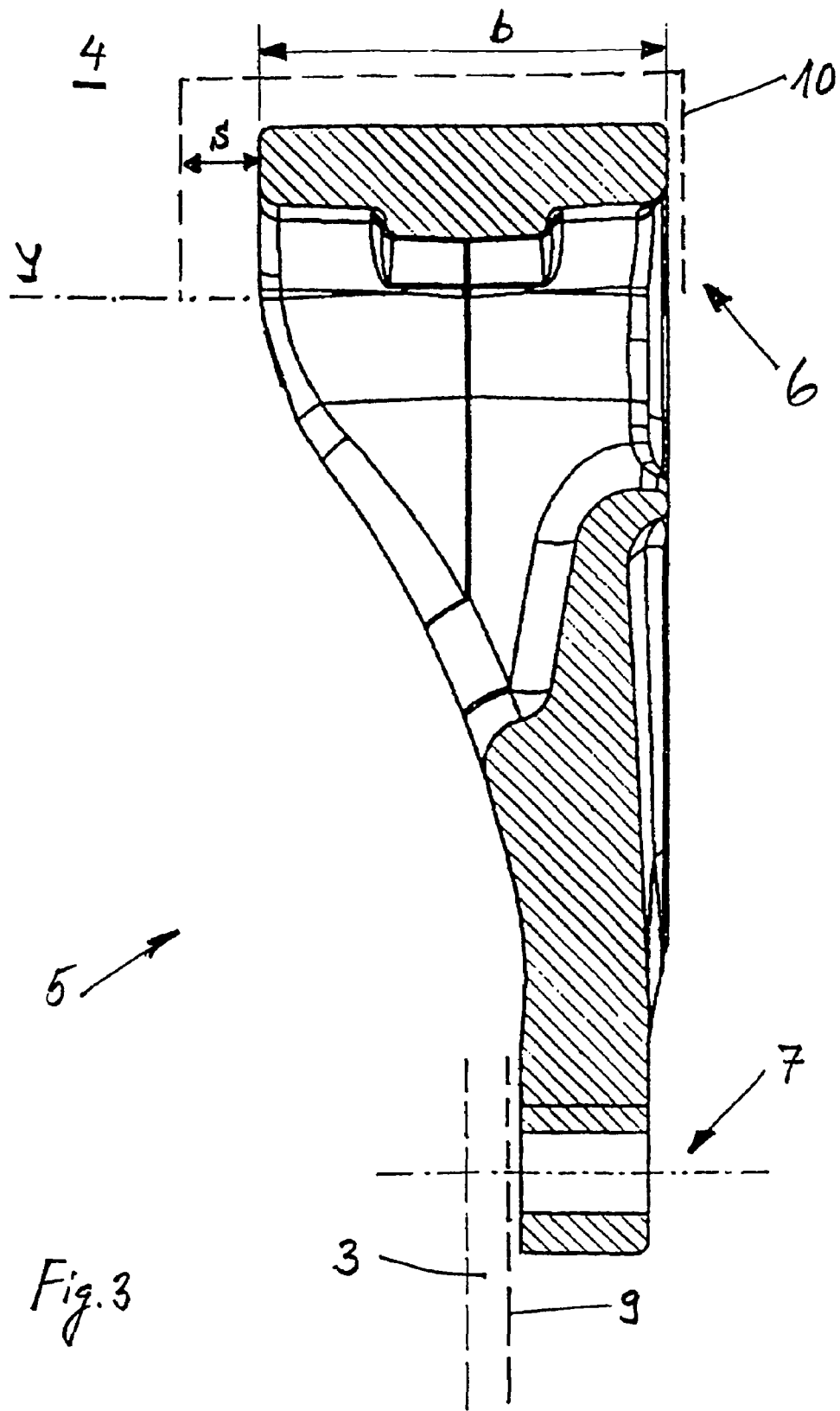
FIG. 3 shows a section through a bearing block perpendicular to the direction of travel.

In FIG. 3, the bearing block 5 is illustrated on its own in a section perpendicular to the direction of travel x. A receiving region 10, which is provided on the underside of the coupling plate 4 for receiving the bearing block 5, is indicated diagrammatically with broken lines in the bearing region 6. The horizontal side surface 9 of the vehicle frame 3 for fastening the bearing block 5 is indicated with further broken lines in the fastening region 7. The bearing block 5 has a width b in the bearing region 6 which is at least 2.5 times the width of the bearing block 5 in the fastening region 7. The bearing block 5 is manufactured as a one-piece casting.

In the dimensioning of the casting, the shape is calculated in such a way that the necessary rigidity is achieved with minimum weight of the casting. On the inner side of the vehicle, the bearing region 6 is machined in such a way after casting that a clearance S remains free in the assembled state between the bearing region 6 of the bearing block 5 and the receiving region 10 of the semitrailer coupling plate 4. This clearance S left free on one side on the inner side of the vehicle serves for compensating movements of the coupling plate 4 in the direction of the pivoting axis y. Such a clearance S is likewise provided on the inner side of the vehicle in the case of the opposite bearing block (not shown here).

In the event of deformation in the direction of the pivoting axis y, these clearances S in each case receive the bearing regions 6 of the bearing blocks 5. In this way, transverse forces which in the operating state act on the semitrailer coupling 1 from the outer side of the vehicle to the inner side of the vehicle are compensated.

A cross-strut, previously mounted between the bearing blocks 5 to take up these transverse forces, is no longer required. Mounting and demounting the cross-strut in the region of difficult access below the coupling plate 4 is dispensed with. The bearing blocks 5 can be adapted to existing semitrailer couplings and existing vehicle frames. The present semitrailer coupling 1 with the newly dimensioned bearing blocks 5 makes possible, with the same load-carrying capacity, a reduction in weight and consequently a fuel saving for the semitrailer truck combination.

The invention claimed is:

1. A semitrailer coupling comprising a coupling plate and a bearing block for movable fastening of the coupling plate to a frame of a tractor, the bearing block includes a bearing region and a fastening region, the bearing region includes bearing means for pivotable bearing of the coupling plate about axis (y) and the fastening region includes fastening means for detachable fastening of the coupling plate to the frame of the tractor, wherein the bearing region has a larger cross section than that the fastening region, when the bearing block is viewed in section in the direction of travel (x) and parallel to pivoting axis (y), wherein between the bearing region of the bearing block and the receiving region of the coupling plate is a clearance wherein the clearance S between the bearing block and the coupling plate along the pivoting axis (y) is greater than the clearance elsewhere, wherein the clearance S compensates for movement of the coupling plate in the direction of the pivoting axis (y).

2. The semitrailer coupling as claimed in claim 1, wherein the bearing region of the bearing block defines with the coupling plate on a clearance for relative movements of the coupling plate and the bearing block in a direction perpendicular to the direction of travel (x) and in the direction of the pivoting axis (y).

3. The semitrailer coupling as claimed in claim 1, wherein the bearing block is formed from a one-piece casting.

4. The semitrailer coupling as claimed in claim 1, wherein the bearing block has a width (b) in the direction of the pivoting axis (y) in the bearing region which is smaller than the width of a receiving region on the coupling plate for receiving the bearing block.

5. The semitrailer coupling as claimed in claim 2, wherein the bearing block has a width (b) in the direction of the pivoting axis (y) in the bearing region which is smaller than the width of a receiving region on the coupling plate for receiving the bearing block.

6. The semitrailer coupling as claimed in claim 4, wherein the width (b) of the bearing region (6) is at least 2.5 times the width of the fastening region (7) of the bearing block (5).

7. The semitrailer coupling as claimed in claim 6, wherein the width (b) of the bearing region (6) is at least 2.5 times the width of the fastening region (7) of the bearing block (5).

8. Fifth wheel comprising a coupling plate and a bearing block for movably fastening the coupling plate to a frame of a tractor vehicle, the bearing block comprising a support zone and a fastening zone, the support zone being designed for swivelable support of the coupling plate and the fastening zone being designed for detachable fastening of the coupling plate to the frame of the tractor vehicle, the support zone having a larger cross-section than the fastening zone in the direction of travel (x) and in section parallel to the swivel axis (y), the bearing block having a width (b) in the support zone in the direction of the swivel axis (y) which is smaller than a width of a receiving zone and which is designed to accommodate the bearing block on the coupling plate in such a way that the support zone of the bearing block is arranged with play (S) in the receiving zone of the coupling plate, wherein the play (S) is designed to absorb the relative movement between the coupling plate and the bearing block in the direction of the swivel axis (y) in the area of the vehicle inboard side of the bearing block.

* * * * *